(12) United States Patent
Binker

(10) Patent No.: US 6,458,403 B1
(45) Date of Patent: Oct. 1, 2002

(54) COFFEE FOAMING SWEETENER

(76) Inventor: Josefa Binker, 13009 Miranda St., Miami, FL (US) 33156

( * ) Notice: Subject to any disclaimer, the term of this patent is extended or adjusted under 35 U.S.C. 154(b) by 0 days.

(21) Appl. No.: 09/546,626

(22) Filed: Apr. 10, 2000

(51) Int. Cl.⁷ .............................. A23F 5/00; A23L 1/48
(52) U.S. Cl. ....................... 426/569; 426/564; 426/594; 426/658
(58) Field of Search ................. 426/594, 564, 426/569, 658

(56) References Cited

U.S. PATENT DOCUMENTS

| 4,438,147 A | * | 3/1984 | Hedrick, Jr. |
| 4,746,527 A | * | 5/1988 | Kuypers |
| 4,748,040 A | * | 5/1988 | Kuypers |
| 5,350,591 A | * | 9/1994 | Canton |
| 5,462,759 A | * | 10/1995 | Westerbeek et al. |
| 5,721,003 A | * | 2/1998 | Zeller |
| 5,780,092 A | * | 7/1998 | Agbo |
| 5,882,716 A | * | 3/1999 | Munz-Schaerer |

* cited by examiner

*Primary Examiner*—Anthony J. Weier
(74) *Attorney, Agent, or Firm*—Ruben Alcoba; Laurence J. Edson

(57) ABSTRACT

The present invention relates to a coffee foaming sweetener that produces a foaming effect in coffee, milk, cafe late or cappuccino that does not require application of chemicals or gaseous elements other than the chemicals found in a ground coffee element or a sweetener element to produce the foaming effect. Furthermore, an espresso machine is not required to produce the foaming effect of this invention.

10 Claims, No Drawings

COFFEE FOAMING SWEETENER

BACKGROUND

This invention allows a health conscious consumer an efficient way of producing a foam on a coffee beverage that does not require the use of an espresso machine nor chemicals or gaseous elements other than the chemicals found in a ground coffee element or in a sweetener element. The product also provides the beverage with a coffee-based sweetener that enhances the taste of the beverage that it is added to. The current method of creating the foaming effect in the coffee beverage is either by using an espresso machine or by using creamers that have chemical or gaseous elements in their makeup other than the ground coffee element or the sweetener element.

Information relevant to attempts to address the foaming effect can be found in U.S. Pat. No. 4,438,147, U.S. Pat. No. 4,746,527, U.S. Pat. No. 4,748,040, U.S. Pat. No. 5,350,591, U.S. Pat. No. 5,721,003, U.S. Pat. No. 5,780,092, and U.S. Pat. No. 5,882,716. However, each one of these references suffers from one or more of the following disadvantages: they use chemicals, gases, or extreme pressures to induce the foam. The aforementioned patents have not addressed the foaming effect in beverages by mixing a coffee-based product that is not chemically or gaseously enhanced by elements other than the ground coffee element or the sweetener element. The coffee foaming sweetener that will address the foam effect solution in this invention is comprised of a coffee mix and a sweetener element.

It is an object of this invention to provide a coffee foaming sweetener that will produce a foam when mixed with a coffee or milk based beverage.

Another object of this invention is to provide the health conscious consumer with, a product that is not chemically enhanced by elements other than the ground coffee element or the sweetener element to produce the foaming effect.

Still another object of the invention is to provide a consumer with a product that will allow the consumer to enjoy an espresso like drink without having to purchase an espresso machine.

For the foregoing reasons, there is need for a coffee foaming sweetener that can inexpensively produce the foaming effect without the need of using an espresso machine or introducing chemicals or gases other than the chemicals in the ground coffee element or the sweetener element.

SUMMARY

The present invention is directed to a process for making a coffee foaming sweetener that satisfies the need to create a foaming effect in a beverage that is either coffee based or milk based without the need of using an espresso machine or by using a product that is made by mixing chemical or gaseous elements other than a ground coffee element or a sweetener element. The process comprises of: first, brewing a coffee mix that is comprised of water and ground coffee; second, adding a sweetener to the coffee mix; third, stirring the mixture of the sweetener and the coffee mix until the sweetener is uniformly distributed within the coffee mix; then blending the sweetener and the coffee mix together, the time required for the blending step will be determined by the sweetener that is utilized in the mixture. The coffee foaming sweetener is used by adding and then mixing one teaspoon of the coffee foaming sweetener to a coffee or a milk-based beverage.

The present invention allows the health conscious consumer the enjoyment of having a drink that is visually enhanced by having the foaming effect without having to purchase an espresso machine or drinking a mixture that produces the foaming effect by the addition of chemical or gaseous elements other than the coffee element or the sweetener element. In addition, the present invention enriches the taste of the beverage that it is added to, for it is a natural coffee based product that is not diluted by chemicals other than the sweeteners required.

These and other features, aspects, and advantages of the present invention will become better understood with reference to the following description and appended claims.

DESCRIPTION

A process according to the present invention for making a coffee foaming sweetener that produces a foam when mixed with coffee or a milk based beverage that comprises the steps of brewing ground coffee with water, thereby producing a coffee mix; adding a sweetener to the coffee mix and then stirring the sweetener and coffee mix together; lastly, blending the coffee mix and the sweetener for a set time, the set time being determined by the sweetener used. The Sweetener used can be a natural sugar or a sugar substitute. The coffee grounds could be caffeinated or decaffeinated.

In the brewing step, ground coffee and water will be brewed together forming a coffee mix, the proportion of ground coffee to water brewed can vary. The proportion of ground coffee to water brewed will be determined by the quality of the ground coffee used and the process used to brew the coffee, but optimally the proportion of ground coffee to water should be about 2 ounces of ground coffee to about 8 ounces of water.

In the adding step, the quantity of the sweetener added to the coffee mix will be determined by the sweetener used in the embodiment of the invention.

The stirring step will be performed until the sweetener is uniformly distributed within the coffee mix.

The time required to blend the sweetener to the coffee mix to form the coffee foaming sweetener will be dependent on the sweetener used in each specific embodiment of the invention.

In the preferred embodiment, a proportion of about 2 ounces of ground coffee to about 8 ounces of water will be brewed together to form a coffee mix. After forming the coffee mix, adding a cane sugar granulate to the coffee mix in a proportion of about 16 ounces of the cane sugar granulate to about 2 ounces of the coffee mix. Then, stirring the mixture of the cane sugar granulate to the coffee mix until the cane-sugar granulate is uniformly distributed within the coffee mix. Lastly, blending the mixture of the cane sugar granulate/coffee mix for about 30 minutes.

In another embodiment of the invention, a proportion of about 2 ounces of ground coffee to about 8 ounces of water will be brewed together to form a coffee mix. After forming the coffee mix, adding an aspartame based sugar substitute to the coffee mix in a proportion of about 8 ounces of the aspartame based sugar substitute to about 1 ounces of the coffee mix. Then, stirring the mixture of the aspartame based sugar substitute to the coffee mix until the aspartame based sugar substitute is uniformly distributed within the coffee mix. Lastly, blending the mixture of the aspartame based sugar substitute/coffee mix for about 5 minutes.

In a further embodiment of the invention, a proportion of about 2 ounces of ground coffee to about 8 ounces of water will be brewed together to form a coffee mix. After forming the coffee mix, adding a saccharine based sugar substitute to the coffee mix in a proportion of about 8 ounces of the saccharine based sugar substitute to about 1.5 ounces of the coffee mix. Then, stirring the mixture of the saccharine based sugar substitute to the coffee mix until the saccharine based sugar substitute is uniformly distributed within the coffee mix. Lastly, blending the mixture of the saccharine based sugar substitute/coffee mix for about 5 minutes.

The sweeteners used when using the natural sugar can be sucrose, fructose, maltose, cane sugar granulate, pure cane brown sugar granulate, and the like, and mixtures of these. The sweeteners used when using the artificial sweeteners could be saccharine or L-aspartyl based sweeteners such as aspartame, and the like and the mixtures of these.

A flavor based extract can be optionally added to the above embodiments. The flavor based extract may be added to the above embodiments after the last step and mixed until the flavored based abstract is uniformly distributed within the embodiments.

The flavor based abstract can be anyone of the commercially available flavorings. The flavorings may be natural or artificial in origin. The amount of the flavor based abstract that will be added to the embodiments will be dependent on the strength of the flavor desired in the coffee based foaming sweetener. Preferably, the flavor based abstract weight will not be more than about 1% of the sweetener/coffee mix weight. The flavors of the flavor based abstracts can include, but are not limited to, Almond Nut, Anisette, Brandy, Cappuccino, Chocolate, Chocolate Mint, Cinnamon, Cinnamon Almond, Creme de Menthe, Kahlua, Macadamia Nut, Peppermint Stick, Pistachio, Raspberry, Sambuca, and Vanilla Bean.

The coffee foaming sweetener is used to enhance the flavor of a coffee based or milk based beverage while at the same time creating an esthetic foam on the beverage that resembles that seen in an espresso or a cappuccino drink. In the typical setting, one would add a teaspoon of the coffee foaming sweetener to a cup of coffee or milk and then mix the coffee foaming sweetener within the beverage that it was added to. If a richer taste or stronger aroma is desired in the beverage that the coffee foaming sweetener is added to, one would simply add more of the coffee foaming sweetener to the beverage.

The previously described versions of the present invention have many advantages, including that the coffee foaming sweetener does not require a chemical or gaseous foaming element outside of the coffee or sweetener elements chosen to create the foaming. To the health oriented consumer, this product provides a method of obtaining the esthetic enjoyment of drinking an espresso or cappuccino without the need using an espresso machine or buying an instant formula that will produce the foaming effect in coffee or milk because of additives other than a coffee additive or a sweetener additive. A further advantage of the invention is that a rich coffee aroma will arise when the coffee foaming sweetener is added to the coffee or milk based beverage that it is added too.

What is claimed is:

1. A process for making a coffee foaming sweetener that produces a foam when mixed with a coffee or a milk based beverage, the process comprising:

a. brewing a coffee mix that comprises a proportion of about 2 ounces of ground coffee to about 8 ounces of water;

b. adding a sweetener to the coffee mix in a proportion of about 8 ounces to 1 ounce of the sweetener to the coffee mix respectively;

c. stirring the sweetener with the coffee mix until the sweetener is uniformly distributed within the coffee mix; and d. lastly, blending the sweetener with the coffee mix for a period of time determined by the sweetener used.

2. A process for making a coffee foaming sweetener that produces a foam when mixed with a coffee or a milk based beverage, the process comprising:

a. brewing a coffee mix in a proportion of about 2 ounces of ground coffee to about 8 ounces of water;

b. adding a cane sugar granulate with the coffee mix in a proportion of about 16 ounces of the cane sugar granulate to about 2 ounces of the coffee mix;

c. stirring the cane sugar granulate with the coffee mix until the cane sugar granulate is uniformly distributed within the coffee mix; and d. lastly, blending the coffee mix with the cane sugar granulate for about 30 minutes.

3. The process for making the coffee foaming sweetener of claim 2 wherein the cane sugar granulate is a pure cane sugar extra fine granulate.

4. The process for making the coffee foaming sweetener of claim 3 further comprising adding a flavored base extract to the coffee foaming sweetener, and mixing the flavored based extract with the coffee foaming sweetener.

5. The process for making the coffee foaming sweetener of claim 2 wherein. the cane sugar granulate is a pure cane brown sugar granulate.

6. The process for making the coffee foaming sweetener of claim 5 further comprising adding a flavored base extract to the coffee foaming sweetener, and mixing the flavored based extract with the coffee foaming sweetener.

7. A process for making a coffee foaming sweetener that produces a foam when mixed with a coffee or a milk based beverage, the process comprising:

a. brewing a coffee mix in a proportion of about 2 ounces of ground coffee to about 8 ounces of water;

b. adding an aspartame based sugar substitute to the coffee mix in a proportion of about 8 ounces of an aspartame based sugar substitute to about 1 ounce of coffee mix;

c. stirring the aspartame sugar substitute with the coffee mix until the aspartame sugar substitute is uniformly distributed within the coffee mix; and d. lastly, blending the coffee mix with the aspartame based sugar substitute for at least 5 minutes.

8. The process for making the coffee foaming sweetener of claim 7 further comprising adding a flavored base extract to the coffee foaming sweetener, and mixing the flavored based extract with the coffee foaming sweetener.

9. A process for making a coffee foaming sweetener that produces a foam when mixed with a coffee or a milk based beverage, the process comprising:

a. brewing a coffee mix in a proportion of about 2 ounces of ground coffee to about 8 ounces of water;

b. adding a saccharine based sugar substitute to the coffee mix in a proportion of about 8 ounces of the saccharine based sugar substitute to about 1.5 ounces of the coffee mix;

c. stirring the saccharine based sugar substitute with the coffee mix until the saccharine based sugar substitute is uniformly distributed within the coffee mix; and d. lastly, blending the coffee mix with the saccharine based sugar substitute for at least 5 minutes.

10. The process for making the coffee foaming sweetener of claim 9 further comprising adding a flavored base extract to the coffee foaming sweetener, and mixing the flavored based extract with the coffee foaming sweetener.

* * * * *